S. M. CAMPBELL.
CONNECTING ROD ALINER.
APPLICATION FILED APR. 21, 1919.
1,398,359.
Patented Nov. 29, 1921.
2 SHEETS—SHEET 1.
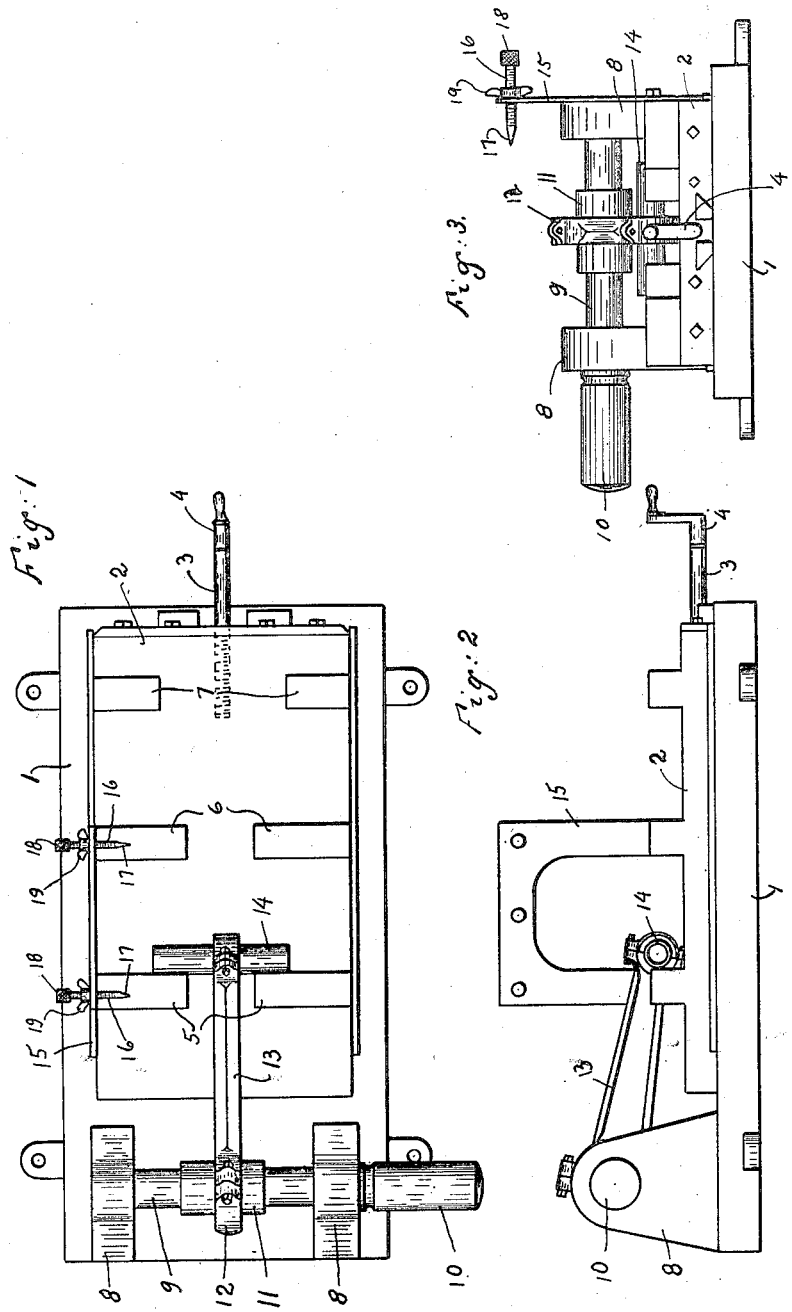
Samuel M. Campbell,
Inventor.
By: Walter N. Haskell,
His Attorney.

S. M. CAMPBELL.
CONNECTING ROD ALINER.
APPLICATION FILED APR. 21, 1919.
1,398,359.
Patented Nov. 29, 1921.
2 SHEETS—SHEET 2.
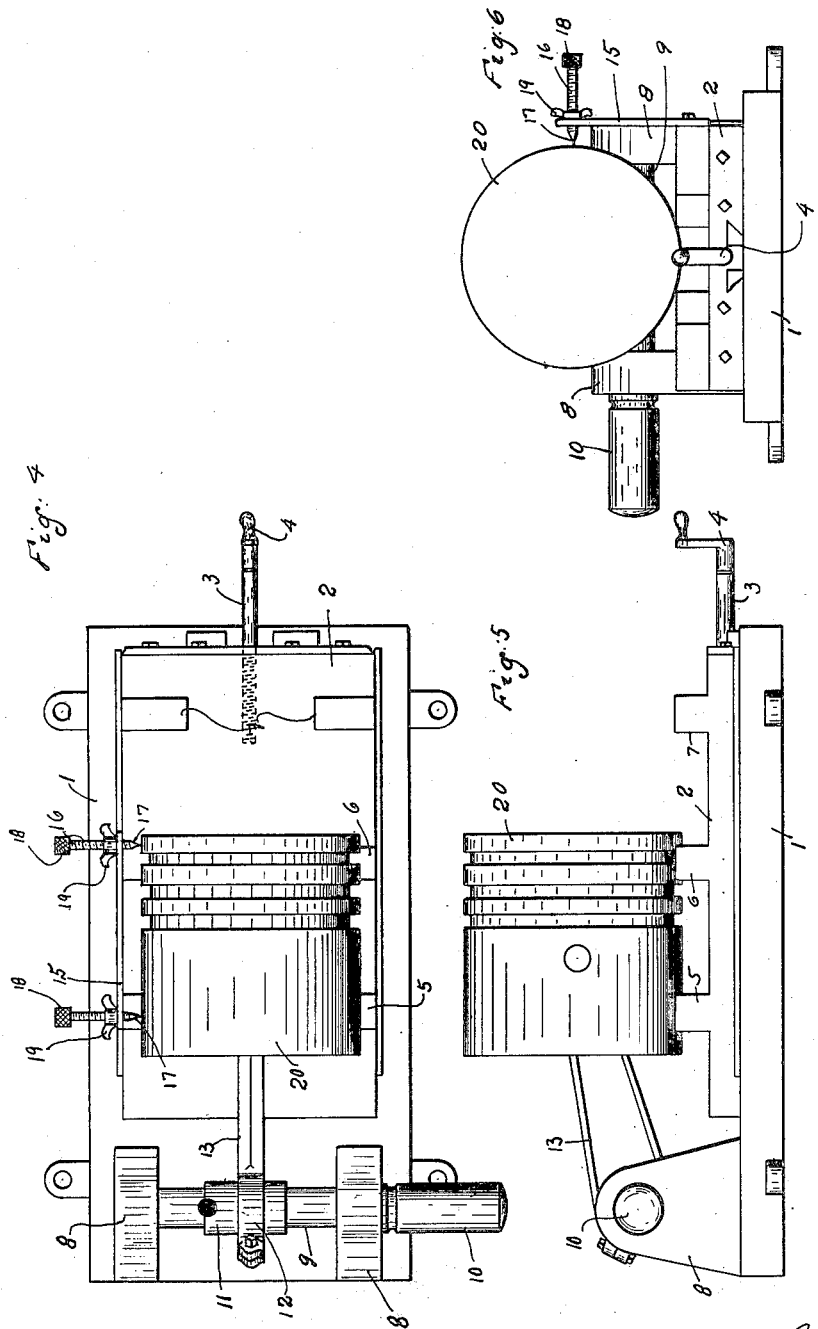

UNITED STATES PATENT OFFICE.

SAMUEL M. CAMPBELL, OF ROCK ISLAND, ILLINOIS.

CONNECTING-ROD ALINER.

1,398,359.  Specification of Letters Patent.  Patented Nov. 29, 1921.

Application filed April 21, 1919. Serial No. 291,707.

*To all whom it may concern:*

Be it known that I, SAMUEL M. CAMPBELL, a citizen of the United States, residing at Rock Island, in the county of Rock Island and State of Illinois, have invented certain new and useful Improvements in Connecting-Rod Aliners, of which the following is a specification.

My invention has reference to machines for testing the connecting rods and pistons of gas-engines, to determine if the same are in proper condition for giving the service required of them. The connecting rods frequently become bent or twisted without the same being visually apparent, but by the use of my device the fault can be readily detected. By the use of my invention it can also be ascertained if the hole for the wrist pin in the piston is true. The invention also embodies novel adjustment features, by means of which it can be adapted to connecting rods of any length and pistons of various sizes.

In the drawings,

Figure 1 is a plan view of my device, with a connecting rod in position therein.

Fig. 2 is a side elevation thereof.

Fig. 3 is an end view thereof.

Fig. 4 is a plan view thereof with a piston in position therein.

Fig. 5 is a side elevation thereof.

Fig. 6 is an end view thereof.

Similar reference characters are used to designate corresponding parts throughout the several figures.

1, is a bed-plate, adapted for support on a table or other suitable structure, upon which is mounted a plate 2, arranged so as to be slidable longitudinally of such bed-plate. At one end of the bed-plate 1 is mounted a bearing 3, in which is rotatably mounted a rod (not shown) having a screw connection with the plate 2, and provided on its outer end with a crank 4. By this means the plate 2 can be adjusted longitudinally of the bed-plate. The upper face of the plate 2 is provided with three pairs of spaced-apart blocks 5, 6 and 7, the purpose of which will be more fully explained hereafter.

At the end of the bed-plate opposite to the crank 4 is a pair of bearings 8 adapted to receive a shaft 9, provided on one end with a hand-hold 10. Mounted on the shaft 9 is a sleeve 11, upon which may be seated the crank-end 12 of a connecting rod 13. To mount the connecting rod on the shaft 9, said shaft is removed from the bearings 8, and upon alining the crank end 12 with the bearings, the shaft is replaced therein with the connecting rod journaled thereon. In the opposite end of the connecting rod is a wrist-pin 14, or other pin similar thereto. The part 12 is caused to engage the sleeve 11 snugly, so that the rod 13 will extend on a line longitudinally of the bed-plate 1. If such connecting rod is straight the pin 14 will be parallel with shaft 9, and the ends of the pin will have a uniform contact with the outer faces of the blocks 5, as shown in Fig. 1, the faces of said blocks being parallel with said shaft and in vertical alinement with each other. If the connecting rod is bent out of straight line, the pin 14 will not be parallel with the shaft 9, and the ends of such pin will not be in uniform engagement with the blocks 5, the position of such pin with relation to the blocks indicating wherein the fault is, and the necessary corrections to be made in the connecting rod.

If it is desired to determine whether or not the connecting rod is twisted, the pin 14 is raised a little, and the plate 2 moved until the blocks 5 are brought beneath the pin, which is then rested on the upper faces thereof. If the connecting rod is in proper condition the pin 14 will rest evenly upon such blocks, but if such rod is twisted out of a true line, one or the other of the ends of the pin 14 will be out of contact with the blocks 5, disclosing the fault, and indicating wherein the same may be corrected.

For the testing of connecting rods of greater length and size, the other pairs of blocks 6 or 7 may be employed, although any one pair of such blocks can be adjusted through a considerable range, to accommodate the same to rods of varying length. Sleeves 11 of varying diameters can also be used for different sized connections on the ends of the rods, and in some cases the shaft 9 alone will be used.

At one side of the plate 2 is fixed a frame 15, in the upper part of which is mounted a series of screw-threaded pins 16, provided on their inner ends with points 17. Said pins, which are preferably two in number, are provided on their outer ends with knurls 18, and may be locked from movement by means of thumb-nuts 19. This part of the device is made use of in testing the piston 20. The connecting rod and piston are assembled, the connecting rod is put in position in the aliner as described above, while the piston is resting on the blocks 5 and 6 as shown in the last three figures. The adjustable pins or screws 16 are then established with their points in contact with the piston. The assembled connecting rod and piston is then given a half rotation (180 degrees). If the wrist pin hole is true the points 17 will be in contact with the piston as before. If these points are not in such contact the wrist pin hole is out of true.

What I claim and desire to secure is,

1. A device of the class described, comprising a bed-plate; an auxiliary plate mounted on said bed-plate so as to be movable longitudinally thereof, and provided on its upper face with two or more pairs of spaced-apart transverse blocks; and a shaft removably mounted on said bed-plate; the vertical faces of each of said pairs of blocks being in alinement with each other and parallel with the line of said shaft, and the horizontal faces of each of said pairs of blocks being in alinement with each other.

2. A device of the class described, comprising a plate, provided on its upper face with means for supporting a piston with its connecting rod longitudinally in line with said plate; a shaft removably mounted at right angles with the longitudinal line of said plate; and a frame supported at one side of said piston supporting means, and provided with two or more pins projecting inwardly therefrom, the inner ends of said pins being in a plane at right angles with said shaft.

3. A device of the class described, comprising a plate, provided on its upper face with means for supporting a piston with its connecting rod in line with said plate, longitudinally; a shaft removably mounted at right angles with the longitudinal line of said plate; a frame supported at one side of said piston-supporting means; and two or more pins adjustably mounted in said frame, capable of having their inner ends brought into alinement in a plane at right angles with said shaft.

4. A device of the class described, comprising a plate provided on its upper face with a piston supporting device; a piston measuring device mounted at one side of said piston supporting device; and means for supporting the connecting rod of a piston on a line parallel with the plane of said measuring device.

5. A device of the class described, comprising a bed-plate; an auxiliary plate adjustable longitudinally thereon, and provided with devices for supporting a piston with its connecting rod in line with the longitudinal line of said plate; piston gaging mechanism mounted at one side of said piston supporting devices; and means on said bed-plate for holding the connecting rod of a piston in a line parallel with the line of action of said gaging mechanism.

In testimony whereof I affix my signature.

SAMUEL M. CAMPBELL.